3,058,845
PROCESS FOR METALLIZING POLYACRYLONITRILE SHAPED ARTICLE BY TREATING WITH A WATER SOLUBLE METAL SALT AND REDUCING THE SALT TO THE FREE METAL

Robert William Hendricks, Wilmington, Del., assignor to E. I. du Pont de Nemours and Company, Wilmington, Del., a corporation of Delaware
No Drawing. Filed June 23, 1959, Ser. No. 822,198
10 Claims. (Cl. 117—138.8)

This invention relates to the preparation of polymers in the form of shaped articles containing a substantial amount of free metal or other insoluble particles. More particularly, the invention relates to the preparation of self-supporting polymeric films containing free metal particles, so-called metallized films.

Metallized films and similar metallized polymeric articles are becoming increasingly important in this electronic age. Shielding for electronic and magnetic equipment, tape for magnetic recording devices, units in radiant heating structures, seat covers for automobiles, wave guides for microwave applications and in construction of electrolytic condensers are only some of the uses for these metallized polymeric articles. If the cost of forming these articles could be reduced and the process of forming them improved, then the market for these materials would be almost limitless.

Heretofore, these metallized articles have been formed using sputtering, vacuum or electroplating techniques. Any method less complicated or less expensive than these has failed to provide adequate adhesion between particle and base material. Even the aforementioned techniques sometimes require a preliminary surface treatment, e.g., mechanical roughening, chemical modification, or so-called freshening, for satisfactory results. In some instances, the surface must be heated and, in the case of many metal particles, the prior art processes are a slow, tedious affair.

An object of the present invention is a relatively speedy, simple and economical technique to metallize shaped articles, the adhesion of particle to shaped article being firm and tenacious. A further object is to metallize without adversely affecting the desirable properties of the polymeric base material. Other objects will appear hereinafter.

Although the process will be described primarily as a process for metallizing films and the like, it should be understood and it will be clear from the specification that the process is also applicable for preparing polymeric materials containing other insoluble particles.

The objects are accomplished primarily by a critical selection of base materials and a critical selection of the particle-providing substances.

Specifically, the objects are accomplished by a process which comprises the steps in sequence of treating a high molecular weight polymeric material, said material composed of polymeric chains and a plurality of radicals attached to the polymeric chains, said radicals selected from the group consisting of —NH, —CN, and —OH radicals, with an aqueous solution of a water-soluble metal salt of metals selected from the group consisting of cobalt, copper, iron, lead, nickel and silver; converting said soluble metal salt to water-insoluble particles of the free metal of said soluble salt; and, thereafter, drying the particle-containing polymeric material.

The polymeric material is preferably polyacrylonitrile. However, copolymers of acrylonitrile with alkyl acrylates (methylacrylate), alkyl alkacrylates (methyl methacrylate), styrene, butadiene, methacrylonitrile, vinyl stearate, vinyl acetate, vinyl chloride, N-vinyl pyrrolidone, 2-methyl-5-vinyl pyridine, vinylarene sulfonic acids and salts thereof, etc., wherein acrylonitrile is the major component (at least 75% of the copolymer is acrylonitrile) are also contemplated for use in the present invention. Polymethacrylonitrile, polyamides and cellulosic materials such as cellophane, paper and pressed wood may also be used successfully in the process of the present invention.

The polymeric material when treated is usually in the form of a shaped article. The term "shaped article," as used herein, is meant to include films, sheets, fibers, fabrics, rods, tubes and the like. The preferred form of shaped article, as will be evident from the subsequent examples, is a self-supporting film of the polymeric material.

The expression "water-soluble" metal salt refers to a salt of an acid and a metal as defined above which is soluble in water at 20° C. to the extent of at least one mole percent, preferably at least ten mole percent. The aqueous solution of the water-soluble metal salt should be capable of swelling the polymer to at least a weight gain of ten percent at some temperature below 175° C. The surprising success of the process of the present invention is believed to be attributable to the swelling effect induced by the above-described metal salt solutions on the above-defined polymer materials.

The suitability of a particular aqueous salt solution can be established by placing 0.1 gram of the finely-divided polymer in 10 milliliters of the aqueous salt solution and stirring the mixture. If the polymer swells to the extent of at least a 10 percent gain in weight, then the salt solution is suitable in the present invention. A list of salts useful in the present invention are marked by a cross (X) in the following table, Table I.

TABLE I
Water-Soluble Metal Salts for Use in Present Invention

| Negative ion | Nitrate | Sulfate | Bromide | Chloride | Iodide | Acetate | Chlorate | Thiocyanate |
|---|---|---|---|---|---|---|---|---|
| Metal ion: | | | | | | | | |
| Cobalt | X | X | X | X | X | X | X | |
| Copper | X | X | X | X | | X | | X |
| Iron (ferric) | X | X | X | X | X | | | |
| Lead | X | | | | | X | X | |
| Nickel | X | X | X | X | X | X | X | |
| Silver | X | | | | | | | |

The following six aqueous salt solutions have been found to be particularly suitable for the process of the present invention: 25–50% silver nitrate, 30–70% ferric chloride, 30–50% cupric nitrate; 20–35% nickel chloride, 15–30% lead acetate and 40–70% nickel nitrate.

By causing the polymeric material to swell, the metal salt tends to impregnate the polymeric material so that upon conversion to insoluble particles the resulting particles are firmly adhered to the polymeric material. The extent of impregnation is preferably to a depth of at least 1% of the article's thickness. Impregnation is controlled by the concentration of the metal salt, the length of time of treatment (a minimum of 10 seconds is usually required), and the temperature of the treatment (an elevated temperature tends to assist impregnation). The treatment may be used to impregnate the polymeric material throughout its thickness. However, to avoid unreasonable loss in the properties of the base material, particularly of oriented films, impregnation should be limited so that at least 50% of the thickness of the article is free of impregnation. If desired, an organic compound such as dimethylsulfoxide, dimethylformamide, butyrolactone, dimethylacetamide, N-methyl-pyrrolidone and the like may be used along with the metal salt solution to increase the rate of swelling of the polymeric material by providing better wetting of the polymer and, thus, to increase the extent of impregnation.

The conversion to insoluble particles may entail reducing the impregnated metal salt to the free metal by reaction with a solution of sodium borohydride, hydroquinone, pyrogallol, catechol, diborane, sodium sulfite, sodium bisulfite, sodium hyposulfite, hypophosphorous acid, hydrazine, hydrazine hydrochloride or reducing sugars such as dextrose. Mixtures of metal salts may be employed if desired with the resultant product, after reduction, containing metallic magnetic alloys, such as nickel-cobalt. Such alloy compositions have magnetic properties making them useful in magnetic tapes.

Conversion to useful insoluble metal salts may be accomplished by reaction with other normally soluble salts or an acid. Thus, the soluble silver nitrate may be reacted with sodium halides or with halogen acids to convert the silver nitrate to insoluble photosensitive silver chloride, bromide, iodide or mixtures thereof. Such structures are useful as photographic films and offer the advantage of low temperature sensitivity as compared with gelatin emulsion films which are conventionally used. Other useful insoluble metal salts are lead chromate, lead sulfate, lead chloride, lead carbonate, silver sulphate, silver pyrophosphate, silver chromate, cobaltic sulphate, cobalt sulfide, cupric carbonate, cupric chromate, cupric oxalate, cupric sulfide, cupric phosphate, ferric phosphate and ferric sulfide. These latter salts impregnated in structures tend to impart flame-resistance, fungus-resistance, static-resistance, etc., to the structures. Some impregnated structures make excellent radiation shields or serve as substrata for decorative laminates.

To prepare a metallized article, the polymeric shaped article may be treated by immersion in a bath of the water-soluble metal salt followed by immersion in the converting bath. A shiny metallic appearing article can be made after only 10-second contact with each of the two baths involved. Heavier coatings are obtained by using several treatments in each of the baths. Alternatively, single treatments of greater duration in each bath may also be used to obtain heavier coatings. However, the short, repeated, treatments alternating between the two baths or a series of alternate baths in sequence are preferred for building up heavy coatings. The final concentration of particles in and on the polymeric material may range anywhere from 0.5% to as high as 65% of the total weight of polymer plus particles, without substantially altering the physical properties of the polymeric substrate. However, for most purposes, a range of 15–45% of particles suffices. As described in copending application Serial No. 740,140, filed June 5, 1958, by K. R. Osborn and assigned to the assignee of this application, heat treatment of the preferred oriented polyacrylonitrile films results in collapse of internal voids introduced during stretching. This effect may be used to lock in the metals or salts introduced by the process of this invention by carrying out such heat treatment after metallizing the film as described.

Although treatments involving immersion of the polymeric materials in baths of the particle-providing reactants have been described, it should be understood that other modes are also useful. Thus, brushing, spraying or painting in any manner may be used successfully. It is preferred to treat the base materials so that the particles are deposited primarily in or near the surface of the base materials. Loss of desirable physical properties of the polymeric base material is thus kept to a minimum.

The final articles may be used as such as electrolytic condensers, in magnetic recording devices, as catalyst carriers, as automobile seat covers, etc. The articles may also be used as a base material or anchorage subcoat upon which to plate other metals. Superior adhesion of the resulting metallic coating is thus obtained.

The invention will be more clearly understood by referring to the examples which follow, Example 1 representing the best mode contemplated for performing the process of the invention. The examples, which illustrate specific embodiments of the present invention, should not be considered to limit the invention in any way. In the examples, all parts are by weight unless otherwise specified.

*Example 1*

Samples of two-way stretched polyacrylonitrile film were prepared in the following manner by photopolymerization from the following ingredients:

32.5 mole percent distilled acrylonitrile
15.2 mole percent zinc chloride
52.3 mole percent distilled water Hydrochloric acid and benzoin, each in an amount less than 1% based on the weight of the main ingredients, were also used in the preparation.

The resulting viscous solution was poured between two thin glass plates spaced 20 mils apart. Ultraviolet light from a bank of five 15-watt fluorescent sunlamps was radiated upon the solution for about 20 minutes. The plates were separated to leave a salt-containing polyacrylonitrile film.

The film was stretched in two mutually perpendicular directions at room temperature (23° C.) and 50% relative humidity to about 3 times its original dimensions (200% elongation) using simultaneous stretching in a machine stretcher. While in the stretcher, the film was placed in a pan to which was added water at 15° C. After about 16 hours of soaking in the cold water, the film was washed for one hour with water at 65° C. and then dried under tension for one hour at 120° C.

After removing the samples from the stretcher, the film samples were soaked in a saturated solution of silver nitrate in distilled water for periods ranging from 10 seconds to 2 minutes. The samples were removed and immediately placed in an aqueous solution of sodium borohydride (10% by weight) for corresponding time periods. Immediately upon immersion in the second solution, a vigorous reaction ensued. The film surface became shiny and metallic in appearance at once. The films remained tough after this treatment. Using a Volt-Ohmyst meter for determining electrical conductivity and with the electrodes touching the film surface, a typical sample showed a resistance of 10 ohms, which is equivalent to a surface resistivity of less than 200 ohms/square.

EXAMPLE 2

Samples of polyacrylonitrile film prepared as in Example 1 were first immersed for one minute in a solution of 100 g. silver nitrate in a mixture of 100 g. water and 110 g. dimethyl sulfoxide at room temperature. The film was then immediately immersed for one minute in a 2% solution of sodium borohydride in water. The film was wiped with a paper towel, then re-immersed in the first solution for approximately 10 seconds, then in the second solution for approximately 10 seconds. This treatment was repeated eight times. From the weights of the starting and final film samples, it was calculated that the final films contained about 54% silver, based on the total weight.

As shown in the following table, the good physical properties of the starting film were essentially unaffected by the treatment. The well-adhered metal coating (which partially penetrated the surface of the film) resulted in very good surface conductivity, with the center of the film remaining an insulator. It was shown by electrical measurements that the two-sided coated film constitutes a condenser. The room temperature electrical properties are given in the table.

TABLE II

*Electrical Properties*

[Measured at room temperature]

A. Surface resistance, ohms (1" x 6" strips)

| Electrodes | Silvered film | Control film |
|---|---|---|
| Probes, 1 cm. apart | 0.8 | >$10^9$ |
| Probes, 10 cm. apart | 2.6 | >$10^9$ |
| Painted probes, 5 cm. apart | 2.3 | >$10^9$ |

B. Volume resistance (ohms-cm.)

| Electrodes | Silvered film | Control film |
|---|---|---|
| Circular one inch contact electrodes | $10^{11}$–$10^{13}$ | >$10^{14}$ |
| Circular one inch painted electrodes | $10^9$–$10^{10}$ | >$10^{14}$ |

*Physical Properties*

| | Silvered film | Control film |
|---|---|---|
| Pneumatic impact strength (kg.-cm./mil) | 4.4 | 6.7 |
| Tear strength (grams/mil) | 6.2 | 5.0 |
| Zero strength temperature, °C | 381 | 436 |

EXAMPLE 3

The two-way stretched polyacrylonitrile film of Example 1 was treated with an aqueous solution containing 50% ferric chloride hexahydrate at steam bath temperature for 5 minutes. The film was then immersed in a 2% solution of sodium borohydride. An adherent black deposit, primarily metallic iron, appeared on the surface of the film. The film could be picked up with a magnet, illustrating the resulting magnetic properties of the film.

EXAMPLES 4–5

A saturated aqueous solution of silver nitrate was painted on a polyacrylonitrile film using a cotton swab to moisten areas in the shape of letters on the film. This film was then immersed in an aqueous 2% solution of sodium borohydride, producing silvered letters where the solution had been applied. The film was washed with water and dried. The metallic coatings were shiny, opaque and adherent.

In Example 5, the solution painted on the film contained 100 parts silver nitrate, 100 parts water and 110 parts of dimethylsulfoxide by weight. It was found that, although better wettability on the film surface was obtained with this solution, the metallic letter was substantially the same as that prepared in Example 4. The conductivity of the metallic areas was substantially that obtained in Example 1.

EXAMPLE 6

A sample of two-way stretched polyacrylonitrile film, 2 mils thick, was immersed in a solution prepared from equal parts by weight of silver nitrate, water and dimethylsulfoxide for approximately 30 seconds. The film was next blotted dry with a paper towel and hydrogen chloride gas was passed over the surface on one side of the film for approximately 30 seconds. The initially clear surface became nearly opaque and white upon this treatment with hydrogen chloride. The film was then placed under a transparent sample of film which had the letter "B" inscribed on it in opaque ink, and the resulting laminar structure was placed in front of a bank of fluorescent sunlamps for approximately one minute with the silver chloride-containing film behind the lettered film. Upon removal from the lamps, the top film was peeled off and it was found that the image of the letter was visible (as a semi-transparent white-unreduced portion) on a black background of reduced silver in the bottom film. The resulting film was then washed thoroughly in a bath of saturated sodium thiosulfate to remove unreduced silver chloride and silver nitrate to "fix" the image. The excellent physical properties of the base polyacrylonitrile film were virtually unaffected by the treatment.

EXAMPLE 7

An oriented polyacrylonitrile film was impregnated with a solution of silver nitrate, water and dimethylsulfoxide in a manner identical with that used in Example 6, then immersed in a solution of 5 grams of hydroquinone in 100 ml. of distilled water at room temperature for 2–3 minutes. An adherent coating of silver was formed on the film. This treatment was repeated three times. The surface resistivity of the resulting film was 1.0 ohm/square.

EXAMPLE 8

A sample of 1.5 mil polyethylene film was irradiation-grafted with acrylonitrile by subjecting the film while immersed in excess acrylonitrile monomer to 10 megarads irradiation with a 2-mev. Van de Graaff accelerator. The film after extraction in dimethylformamide at 100° C. for 2 hours and drying showed a weight gain of 295% as a result of the grafting. The presence of grafted cyano groups was shown by the appearance of a new absorption band at 4.5 microns in the infrared spectrum of the grafted film. The grafted film was immersed for 3 minutes in a silver nitrate/dimethylsulfoxide/water mixture (equal parts by weight), then immersed in a 2% aqueous sodium borohydride solution. This treatment was repeated four times. The initially transparent film was converted to a shiny metallic opaque appearance. The resistance of the strip of film 4½ x ½ centimeter was 8000 ohms, corresponding to a surface resistivity of about 5000 ohms/square.

A sample of ungrafted polyethylene, no —CN groups present, subjected to the same treatment was not metallized. The resistance of the latter sample was greater than $10^9$ ohms/square.

EXAMPLE 9

A solution was prepared by dissolving 5 grams of cupric nitrate hexahydrate in 10 ml. of distilled water. To this was added 2 drops of concentrated ammonium hydroxide. A strip of 300-gauge regenerated cellulose film was immersed in the solution for approximately 2 minutes, then placed in an aqueous bath containing 2% sodium borohydride. A vigorous reaction ensued with evolution of gas and formation of a precipitate within the film. The film was washed, then the above treatment was repeated a total of six times, after which the film was dried. The film took on a shiny bronze-like appearance upon subsequent rubbing with a paper towel. The electrical resistance of the treated sample was 2000 ohms/square while that of a similar, untreated regenerated cellulose sheet was greater than $10^9$ ohms/square.

The final treated sample weighed 30.7 mg. while a sample of untreated starting material the same size weighed 11.4 mg. The dry cellulose in the starting sample weighed 10.1 mg., while the copper in the final sample weighed 19.3 mg. This film was shown to be conductive throughout, not just at the surface and outer edges. Scraping the film to remove any possible surface layer resulted only in tearing and abrading the film itself. Examination of the film in a microscope with the film mounted edgewise between the edges of glass slides revealed that the entire body of film transmitted no light. This further indicated that the metal was distributed throughout the treated film.

EXAMPLES 10-11

A sample of 300 gauge regenerated cellulose film was immersed in a solution of 60% silver nitrate in water for 30 seconds, then immersed in an aqueous solution containing 1% sodium borohydride buffered to a pH of 10.0. The film was next rinsed in water, then dried.

For Example 11, a sample of regenerated cellulose film was recycled a total of four times through the treatment of Example 10, then dried and polished with a paper towel before thorough drying. The thickness of the initial film was 0.9 mil; that of the film treated once (Example 10) was 1.5 mils; that of the film treated four times (Example 11) was approximately 2.3 mils. Both the untreated and the single treated film of Example 10 had a surface resistance greater than $10^9$ ohms/square. The sample treated four times (Example 11) had a surface resistivity of 10 ohms/square. Both of the treated films (Examples 10 and 11) had a shiny opaque metallic appearance.

EXAMPLE 12

A sample of unstretched polyethylene terephthalate film was radiation-grafted with acrylonitrile monomer by irradiation of the film in contact with excess acrylonitrile monomer, using 20 megarads irradiation, in the manner described in Example 8. The film showed a net weight gain after extraction with dimethylformamide of 15%. A portion of this film was immersed for 2 minutes in a bath made up of equal parts of silver nitrate, dimethylsulfoxide and water, at room temperature, then was treated with a 2% sodium borohydride solution. This resulted in the formation of a shiny metallic adherent coating on the film. After a second treatment as described above, the film was dried and polished to a highly reflective surface. The surface resistivity of the film was approximately 100 ohms/square.

A control sample of non-grafted polyethylene terephthalate film was essentially unchanged by a similar treatment and showed a surface resistivity greater than $10^9$ ohms/square.

EXAMPLES 13-15

Samples of polyamide films prepared from metaphenylene diamine and isophthalic acid (Example 13), metaphenylene diamine and 70 isophthalic acid/30 terephthalic acid (Example 14), and paraphenylene diamine with isophthalic acid (Example 15) were converted to silvered films by the following method: The films were treated with the silver nitrate solution similar to that of the preceding example for one minute after a prior treatment with dimethylformamide at 100° C. for 5 minutes. The silver nitrate-containing films were then reduced by immersion in a 2% aqueous sodium borohydride solution. Two repetitions of this treatment gave completely opaque, metallic appearing films.

EXAMPLE 16

A silvered polyacrylonitrile film, prepared as described in Example 1, was plated by immersion in the following plating bath at 65° C.: 100 parts distilled water, 2.4 parts nickel chloride hexahydrate, 0.3 part of dimethylamine-borane and 1.6 parts sodium acetate adjusted to a pH of 5.0 by the addition of 6 drops glacial acetic acid. Hydrogen evolved from the film surface. After 5 minutes immersion in the bath the film was removed. The surface resistivity of the film before plating was 2.9 ohms/square, while that of the final film was 0.6 ohm/square. The final film had a different appearance than the starting film, being somewhat more gray in color due to nickel than the initial silvered film. The adhesion of the nickel layer to the original silvered film was outstanding. The resulting thin, smooth metallic coating made this film particularly suited for use as a magnetic recording member having especially good high frequency response. A mixed layer of metals, such as a nickel-cobalt alloy, could be similarly plated on the silvered film and the resulting product would have suitable coercivity for magnetic recording.

EXAMPLES 17-20

The following films were treated in a manner identical to that described for Example 16.

In Example 17, a regenerated cellulose film containing silver prepared by impregnation-reduction as described in Example 9, showed a nickel-plated film that was very shiny and metallic appearing. The surface-resistivity was greater than $10^9$ ohms/square.

In Example 18, a two-way stretched polyacrylonitrile film which had been only lightly silvered by the method of Example 1 was treated as above. The surface resistivity changed from approximately 5000 to approximately 100 ohms/square. The originally dully appearance of the film changed to a very shiny metallic appearance.

In Example 19, a somewhat oxidized-appearing sample of magnetic polyacrylonitrile film which had been prepared by casting a solution of polyacrylonitrile containing ferric chloride onto a preformed stretched film, drying the film and reducing with sodium borohydride was nickel plated by this treatment. The initial resistivity was greater than $10^9$ ohms/square, while that of the final film was approximately 30 ohms/square. The initial film was brown in appearance on the magnetic side while the final film had a dully silvery metallic luster. Both films were magnetic. Portions of the film which had not been coated as described and which did not therefore contain iron were not nickel plated by this treatment.

In Example 20, a sample of copper-containing regenerated cellulose film, prepared as described in Example 9, was nickel plated, resulting in a film with a surface conductivity of 200 ohms/square.

EXAMPLE 21

The two-way stretched polyacrylonitrile film of Example 1 was treated with an aqueous solution containing 25% nickel nitrate and 25% cobalt nitrate at steam bath temperature for 5 minutes. The film was then immersed in a 2% solution of sodium borohydride for 2 minutes. An adherent black shiny surface appeared on the film. The film could be picked up with a magnet, illustrating the resulting magnetic properties of the film.

EXAMPLES 22-23

Samples of metal-containing regenerated cellulose film (300 gauge) were prepared by impregnating the film for 1 minute in an aqueous solution of the specified metal salt, then reducing the wet film by immersion for 1 minute in a 2% aqueous sodium borohydride solution. In all cases, one such treatment resulted in the incorporation of significant amounts of metal. Details are as follows:

In Example 22, a solution containing 50 parts lead acetate trihydrate and 100 parts water was used. The film sample was given three treatments, then dried under tension. It had a very attractive shiny black appearance. The resistivity was greater than $10^9$ ohms/square.

In Example 23, a solution containing 200 parts nickel nitrate hexahydrate and 100 parts water was used. After two treatments, the film was dried under tension. It had a surface resistivity of greater than $10^9$ ohms/square. After four successive treatments, another sample of film dried under tension had a surface resistivity of 10,000 ohms/square.

EXAMPLE 24

A sample of two-way stretched polyacrylonitrile film which had been previously silvered by the method of Example 1 was copper plated using a method identical to that described in Example 16 with the substitution of an equal weight of copper nitrate for the nickel chloride. Prior to copper plating a strip of film had a resistivity of 3 ohms/square, and after copper plating, the resistance was 0.2 ohm/square.

EXAMPLES 25–27

Films which had previously been made conductive by chemical metallizing as described below were electroplated using the following arrangement. The plating solution contained 10% copper nitrate by weight in distilled water. The films were used as a cathode, while a length of heavy copper wire was used as the anode. The film and wire were immersed in the above solution contained in a 400 ml. beaker filled to a depth of 9 centimeters. Clip leads were fastened to the electrodes from a power supply consisting of a 6 volt automobile battery in series with a 0–500 ohm variable resistor and a 0–1 amp. ammeter. In each case, the current was set at 0.5 ampere for a total of approximately one hour. The current densities based on the total immersed areas of the film are given below. The distance between the film and the anode was about 5 centimeters. Stirring was provided by bubbling air through the solution.

In Example 25, a silvered polyacrylonitrile film prepared as described in Example 1 as plated using a current density of 0.01 amp./sq. centimeter. The surface resistivity before plating was approximately 3 ohms/square, and after plating was less than 0.1 ohm/square.

In Example 26, a nickel-plated polyacrylonitrile film prepared as in Example 16 was plated using a current density of 0.04 amp./sq. centimeter. The surface resistivity before plating was approximately 1 ohm/square and after plating was less than 0.1 ohm/square.

In Example 27, a conductive silver-containing regenerated cellulose film prepared by the method of Example 11 was copper plated using a current density of 0.1 amp./sq. centimeter. The resistivity before plating was approximately 10 ohms/square and after plating was less than 0.1 ohm/square.

EXAMPLE 28

A sample of two-way stretched polyacrylonitrile film, 2 mils thick, was immersed in a saturated solution of silver nitrate for approximately 30 seconds. The film was blotted dry with a paper towel and a 50/50 weight percent mixture of hydrogen bromide gas and hydrogen iodide gas was passed over the surface on one side of the film for approximately 30 seconds. The initially clear surface became nearly opaque and pale yellow. The film was then placed under a transparent sample of film which had the letter "B" inscribed on it in opaque ink, and the resulting laminar structure was placed in front of a bank of fluorescent sunlamps for approximately one minute with the silver bromide/silver iodide-containing film behind the lettered film. Upon removal from the lamps, the top film was peeled off and it was found that the image of the letter was visible (as a semi-transparent white-unreduced portion) on a black background of reduced silver in the bottom film. The resulting film as then washed thoroughly in a bath of saturated sodium thiosulfate to remove unreduced silver halide and silver nitrate to "fix" the image. The excellent physical properties of the base polyacrylonitrile film were virtually unaffected by this treatment.

What is claimed is:

1. A process for metallizing a shaped article comprising the steps, in sequence, of impregnating and coating a high molecular weight acrylonitrile polymer shaped article with an aqueous solution of at least one water-soluble metal salt, said water-soluble metal salt impregnating said article to an extent within the range of about 1–50% of the thickness of said article and being soluble to the extent of at least one mole percent in water at 20° C. and said water-soluble metal salt selected from the group consisting of water-soluble cobalt salts, copper salts, iron salts, lead salts, nickel salts and silver salts; reducing said water-soluble metal salt to water-insoluble particles of the free metal of said soluble salt, the concentration of said particles ranging from about 0.5–65% by weight based on the finished article; and, thereafter, drying the particle-containing polymer shaped article.

2. A process as in claim 1 wherein the high molecular weight acrylonitrile polymer shaped article is a self-supporting polyacrylonitrile film.

3. A process as in claim 1 wherein the high molecular weight acrylonitrile polymer shaped article is immersed in an aqueous solution of the water-soluble metal salt for a period of at least 10 seconds thereby impregnating said acrylonitrile polymer with said metal salt.

4. A process as in claim 1 wherein the aqueous solution of the water-soluble metal salt also contains dimethylsulfoxide.

5. A process as in claim 1 wherein the aqueous solution of the water-soluble metal salt also contains dimethylformamide.

6. A process as in claim 1 wherein conversion is accomplished by treatment with a solution of sodium borohydride.

7. A process as in claim 1 wherein conversion is accomplished by treatment with a solution of hydroquinone.

8. A process comprising the steps, in sequence, of immersing a polyacrylonitrile film in an aqueous solution of silver nitrate for a period of at least 10 seconds thereby impregnating said polyacrylonitrile film with said silver nitrate to an extent within the range of about 1–50% of the thickness of said film; immersing the impregnated polyacrylonitrile film into an aqueous solution of sodium borohydride for at least 10 seconds thereby reducing said silver nitrate to silver metal, the concentration of said silver metal ranging from about 0.5–65% by weight based on the finished film and drying the resulting silver containing film.

9. A process comprising the steps, in sequence, of immersing a polyacrylonitrile film in an aqueous solution of ferric chloride for a period of at least 10 seconds thereby impregnating said polyacrylonitrile film with said ferric chloride to an extent within the range of about 1–50% of the thickness of said film; immersing the impregnated polyacrylonitrile film into an aqueous solution of sodium borohydride for at least 10 seconds thereby reducing said ferric chloride to iron metal, the concentration of said iron metal ranging from about 0.5–65% by weight based on the finished film and drying the resulting iron containing film.

10. A process comprising the steps, in sequence, of immersing a polyacrylonitrile film in an aqueous solution of nickel chloride for a period of at least 10 seconds thereby impregnating said polyacrylonitrile film with said nickel chloride to an extent within the range of about 1–50% of the thickness of said film; immersing the impregnated polyacrylonitrile film into an aqueous solution of sodium borohydride for at least 10 seconds thereby reducing said nickel chloride to nickel metal, the concentration of said nickel metal ranging from about 0.5–65% by weight based on the finished film and drying the resulting nickel containing film.

References Cited in the file of this patent

UNITED STATES PATENTS

| 1,662,564 | Colbert et al. | Mar. 13, 1928 |
| 1,731,261 | Pfiffner | Oct. 15, 1929 |
| 1,890,645 | Ow-Eschingen | Dec. 13, 1932 |
| 2,511,472 | Kmecik | June 13, 1950 |

FOREIGN PATENTS

| 691,171 | Great Britain | May 6, 1953 |

OTHER REFERENCES

Schildknecht: Vinyl and Related Polymers, p. 272, Wiley & Sons, New York, 1952.